United States Patent [19]

Hansen

[11] 4,371,048

[45] Feb. 1, 1983

[54] LATCH FOR SIDE PANEL OF ENGINE HOOD

[75] Inventor: Kenneth N. Hansen, Waukesha, Wis.

[73] Assignee: Allis-Chalmers Corporation, Milwaukee, Wis.

[21] Appl. No.: 197,503

[22] Filed: Oct. 16, 1980

[51] Int. Cl.[3] .............................................. B62D 25/12

[52] U.S. Cl. ................................. 180/69 R; 292/175; 292/DIG. 14

[58] Field of Search ........................... 180/69 R, 69 C; 292/175, DIG. 38, DIG. 14; 49/465; 296/191

[56] References Cited

U.S. PATENT DOCUMENTS

| | | | |
|---|---|---|---|
| 1,482,494 | 2/1924 | Weiss | 292/DIG. 14 |
| 1,497,718 | 6/1924 | Gilland | 292/DIG. 14 |
| 2,200,346 | 5/1940 | Sepull | 292/175 X |
| 2,952,328 | 9/1960 | Steiner | 180/69 R |
| 3,498,659 | 3/1970 | Ammon et al. | 292/175 X |
| 3,743,045 | 7/1973 | Hansen | 180/69 R |
| 3,918,540 | 11/1975 | Haupt | 180/69 R |
| 4,073,524 | 2/1978 | Gianessi | 292/341.12 |
| 4,135,747 | 1/1979 | Melilli | 292/175 |
| 4,195,867 | 4/1980 | Baillie | 292/175 X |

FOREIGN PATENT DOCUMENTS

| | | | |
|---|---|---|---|
| 969994 | 6/1975 | Canada | 292/DIG. 38 |

*Primary Examiner*—Joseph F. Peters, Jr.
*Assistant Examiner*—Michael Mar
*Attorney, Agent, or Firm*—Arthur L. Nelson

[57] ABSTRACT

A latch for a side panel of an engine hood mounted on the vehicle chassis and having a seal between the latch structure and the side panel.

7 Claims, 9 Drawing Figures

LATCH FOR SIDE PANEL OF ENGINE HOOD

This invention relates to an engine hood, and more particularly to a latch mounted on the vehicle chassis latching the side panel of an engine hood and sealing the panel with a seal on the latch and vehicle chassis.

Conventionally tractors have an engine compartment for the engine generally defined by the engine hood. The radiator and fan are usually positioned immediately in front of the engine, with the grille positioned forwardly of the radiator. With the grille spaced in front of the radiator an auxiliary compartment is formed in front of the engine compartment which may be used for the air cleaner. The fan blowing the air through the radiator normally receives air from the auxiliary compartment between the grille and radiator as a means of cooling the engine. Accordingly, it is preferable to have clean air in this compartment before it blows through the radiator in order to maintain efficient heat transfer between the air and the coolant in the radiator.

The Haupt patent, U.S. Pat. No. 3,918,540 illustrates a tractor of this type having an engine hood and side panels and an auxiliary compartment immediately in front of the radiator. The applicant's invention provides a latch for a side panel which fastens the panel on the side of the tractor with a seal around the auxiliary compartment to assure that chaff, dirt, etc., are not drawn into the radiator which would decrease the efficiency of the cooling system. The latch extends to the underside of the tractor chassis. The latch extends from the inside and provides a seal while latching the panel against the side of the tractor.

It is an object of this invention to provide a latch for a side panel of an engine hood on the tractor.

It is another object of this invention to provide a latch on the vehicle chassis for latching the side panel on the engine hood on the side of the tractor.

It is a further object of this invention to provide a latch for a side panel of an engine hood mounted on the vehicle chassis holding a side panel against a seal on the latch structure for sealing the panel in its latched position.

It is a further object of this invention to provide a latch on the tractor chassis holding a side panel of an engine hood and flexing to allow shifting movement of the side panel due to a normal strain and deflection during operation and maintain the latch in the latched position and providing a seal between a latch structure and the side panel.

The objects of the invention are accomplished by a latch mounted on the front axle support of the vehicle chassis. The latch extends upwardly through the support to engage the inside of the panel and flexes to accommodate shifting movement of the side panel and avoid unlatching due to distortion of the latch or side panel. A seal is also provided on an element of the latch structure which presses against the side panel to seal the auxiliary compartment and engine compartment from external dirt and impurities which may cause the reduction of the efficiency of the cooling system as the air is blown through the radiator.

Referring to the drawings, the preferred embodiments of the invention are illustrated.

Figures 1, 2:
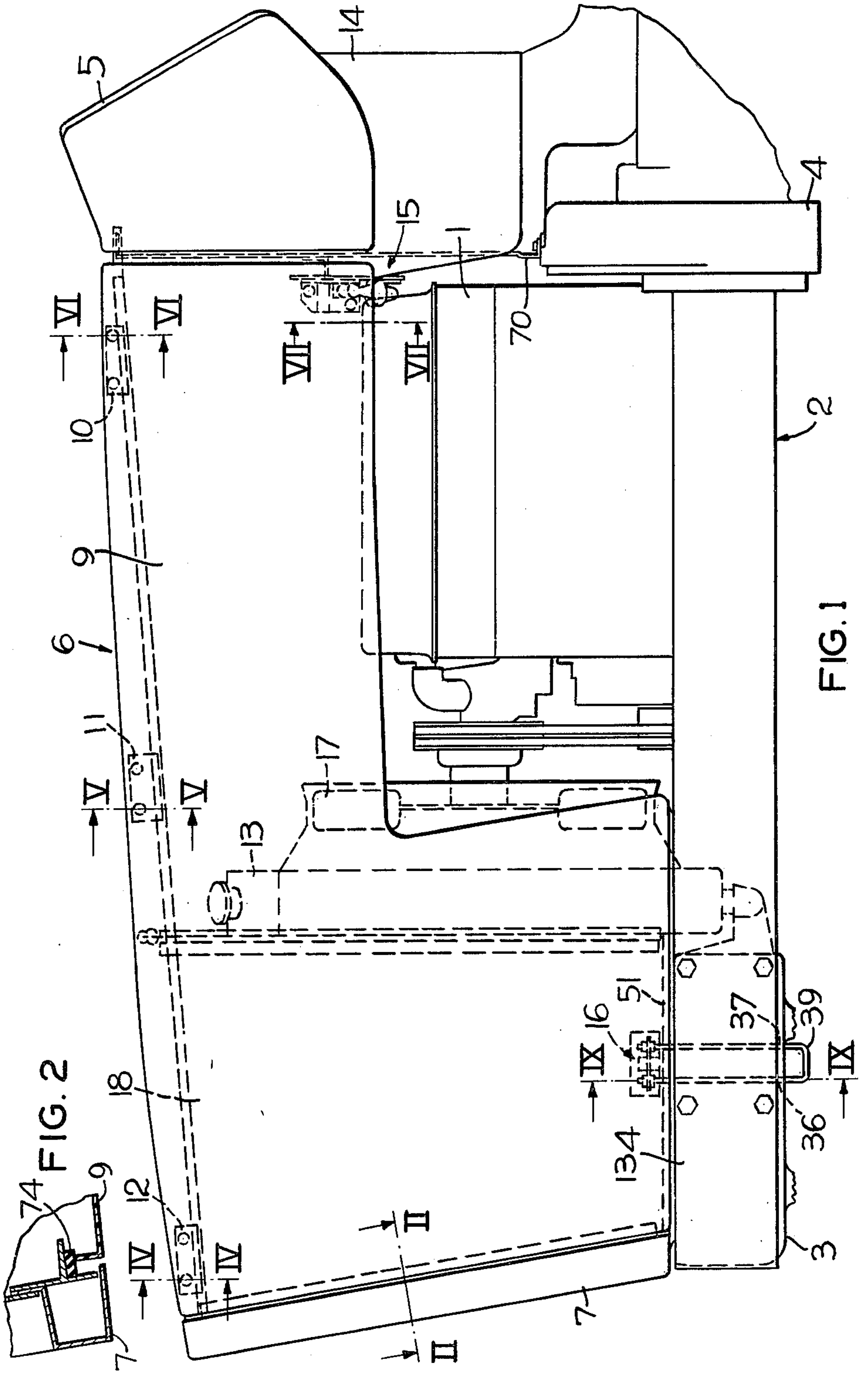
FIG. 1 is a side elevation view of the vehicle engine hood and chassis.
FIG. 2 is a cross-section view taken on line II—II of FIG. 1.
Figure 3:
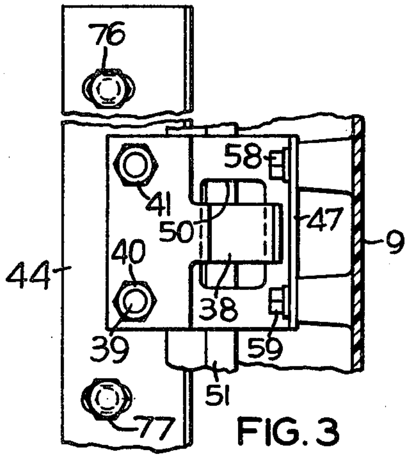
FIG. 3 is a plan view of FIG. 9.

FIG. 1 shows an engine 1 mounted on the vehicle chassis 2 which supports the front side support 3. The chassis includes the transmission housing 4 which in turn supports the instrument panel 5. The engine hood 6 is connected to support bracket 70 in front of the instrument panel 5 and is supported at the front end of the chassis 2 and connected to the grille 7. The engine hood 6 includes the center strip 8 which extends between the grille 7 and the instrument panel 5. The side panel 9 is suspended on three hangers 10, 11 and 12 on center strip 8. The center strip 8 is supported by the grille structure 7, as well as the support bracket 70. The side panel 9 is latched by the latch 15 and the latch 16. The engine compartment is formed within the engine hood between the instrument panel support structure 14 and the radiator 13. An auxiliary compartment 18 is defined by the engine hood between the grille 7 and the radiator 13. The fan 17 is mounted immediately behind the radiator and draws air from the auxiliary compartment 18 and blows air across the engine to provide cooling of the engine.

Figure 4:
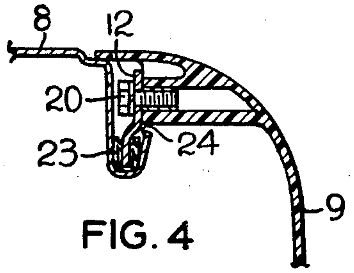
FIG. 4 is a cross-section view taken on line IV—IV of FIG. 1.
Figure 5:
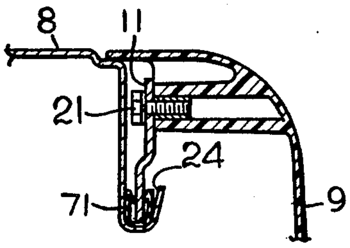
FIG. 5 is a cross-section view taken on line V—V of FIG. 1.
Figure 6:
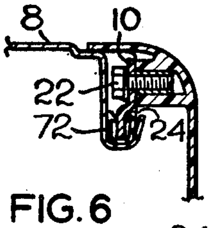
FIG. 6 is a cross-section view taken on line VI—VI of FIG. 1.
Figure 9:
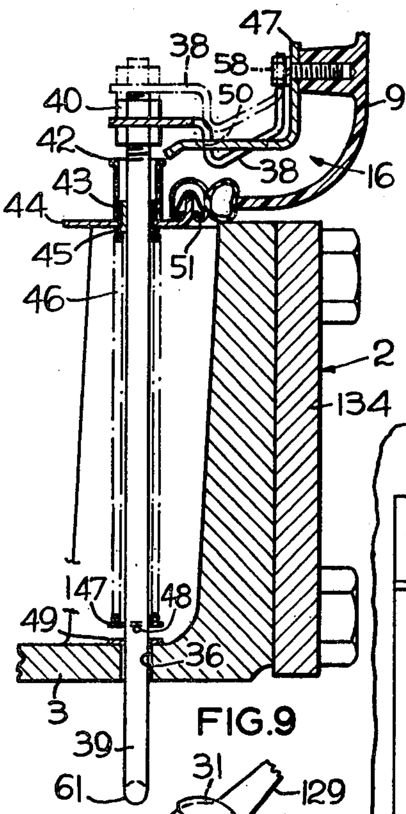
FIG. 9 is a cross-sectional view taken on line IX—IX of FIG. 1.

FIGS. 4, 5 and 6 show section views of the hangers 12, 11 and 10. The side panel 9 is suspended by the hangers which are bolted by the bolts 20, 21 and 22 to the side panel for supporting the side panel. The cushions 23, 71 and 72 are mounted in a trough formed by flange 24 of the depending edge portion of center strip 8.

Figure 7:
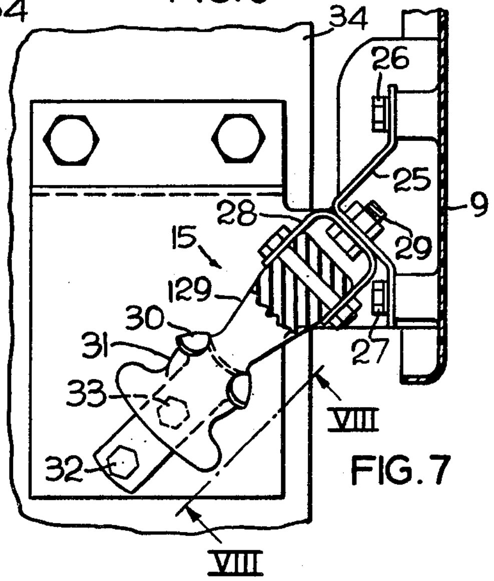
FIG. 7 is a cross-sectional view taken on line VII—VII of FIG. 1.
Figure 8:
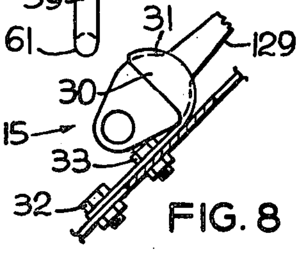
FIG. 8 is a partial side view of the latch shown in FIG. 7 taken on line VIII—VIII of FIG. 7.

FIG. 7 illustrates a latch mechanism for holding the rear end of the side panel 9. The side panel is equipped with a bracket 25 bolted to the panel by the bolts 26 and 27. The latch includes a latch carrier bracket 28 fastened to the bracket 25 by the bolt 29. The latch carrier bracket 28 carries a rubber latch element 129 capable of stretching to seat in the latch retainer 30 in the operating position as shown in FIGS. 7 and 8. Latch element 129 has a nub 31 retained in the bracket 30 which is fastened by the bolts 32 and 33 on the fire wall 34 of the support bracket 70.

The side frame 134 of the chassis 2 is bolted to the front axle support 3. The latch 16 extends through two openings 36 and 37 and extends upwardly to carry the latch hook 38. The latch 16 is formed by a U-bolt 39 which carries latch hook 38 and is fastened by the nuts 40 and 41 which are extended above the latch hook 38. The U-bolt 39 also carries sleeve 42 which forms a stop for the latch 38 when the panel 9 is removed. The sleeve 43 has a shoulder 45 operating as a spring seat for the spring 46. A washer 47 carried on the pin 48 forms a spring seat for the opposite end of the spring 46. A second washer 49 operates as a seat for the pin 48 if the latch is moved downwardly. In FIG. 2, the latch is shown in the latched position.

The side panel 9 carries the anchor bracket 47 which is fastened by means of the bolts 58 and 59. The anchor bracket forms a slot 50 which receives the latch hook 38 in the latched position.

A panel seal element 51 is carried on the seal retainer 44 and extends along the length of the lower edge of a panel 9 to form a seal with panel 9. The latch seal element 51 is carried on the latch seal plate 44 which is carried on the U-bolt 39. The latch seal plate 44 can be adjusted to left or right as a complete system to align side panel 9 with grille 7. These two seal elements 51 and seal 74 form a seal at the edge of the auxiliary compartment between the side panel and the seals during normal operation.

The latch 38 is shown in the latched position and a phantom view shows the latch unlatched with the spring 46 compressed to allow disengagement of the latch for removal of the panel if desired.

The operation of this device will be described in the following paragraphs.

The side panel 9 is assembled by hanging the side panel 9 on the center strip 8 which forms the trough 75 by flange 24 and the panel 9 is hung along the side of the engine. The latch 15 includes a rubber element 129 which is stretched to be received in the latch retainer 30 and allowed to retract into the retained position as shown in FIGS. 7 and 8.

The latch 16 is latched by pressing the panel 9 inwardly so that the latch hook 38 moves upwardly compressing the spring 46 until the hook 38 drops into the slot 50 and the panel is latched.

To unlatch the latch 16, the latch handle 61 is pressed upwardly to compress the spring 46 and the latch hook 38 will lift out of the slot 50 allowing the panel to swing free of the latch.

Alignment of grille 7 and panel 9 is accomplished by tightening and loosening bolts 76 and 77 which fasten the seal plate 44. This is done to assure that there is positive seal at the grille and the lower edge of the side panel 9.

The embodiments of the invention in which an exclusive property or privilege is claimed are defined as follows:

1. A vehicle having an engine hood and latching means comprising, a vehicle chassis including a front axle support means mounted on a side frame, said front axle support defining vertical walls connected to said side frame, with a floor portion extending between said walls, means defining a closed auxiliary compartment including a grille and a radiator mounted on said front axle support means, an engine hood including side panels extending over said grille and radiator and downwardly to said front axle support, a latch having a latch hook, a panel anchor mounted on the front portion of each of said panels for engaging said latch hook in the latched position, means pivotally suspending said side panels from their upper edges, a latch mounted on said vehicle chassis including a U-shaped handle having ends connected to said latch hook extending vertically through apertures in the floor portion of the axle support means inwardly of said panel, a latch hook on said latch engaging said panel anchor in the latched position, resilient means including springs on said latch handle biasing said latch hook downwardly to engage said panel anchor in the latched position, a latch cam on said latch hook formed by a downwardly extending curved portion on said latch hook, said panel anchor defining a downwardly curved leading edge for engagement with said latch cam to raise said latch hook and overcome the force of said resilient means to engage said latch when said panel is swung inwardly to close said compartment, said handle on said latch extending externally of said auxiliary compartment for manually overcoming the force of said resilient means and thereby releasing said latch.

2. A vehicle having an engine hood and latching means as set forth in claim 1, including a second latch for holding the rear portion of said side panel.

3. A vehicle having an engine hood and latching means as set forth in claim 1, wherein said panel anchor defines an oversized opening to receive said latch hook to permit shifting of said side panel for maintaining said latch in the latched position when said side panel flexes.

4. A vehicle having an engine hood and latching means as set forth in claim 1, a seal element carried on said latch, a seal element extending along the lower edge of said side panel for engaging said seal element on said latch for providing a seal at the lower edge of said panel.

5. A vehicle having an engine hood and latching means as set forth in claim 1, including a seal along the lower edge of said side panel to provide a seal between the side panel and the chassis.

6. A vehicle having an engine hood and latching means as set forth in claim 1, including seal means on the upper edge of said panel.

7. An engine hood and latching means as set forth in claim 1, including seal means extending along the lower edge of said side panel, an adjustable seal element on said chassis adjustable to vary the pressure against the seal means on said side panel to assure positive sealing.

* * * * *